US006104836A

United States Patent [19]
Buckley et al.

[11] Patent Number: 6,104,836
[45] Date of Patent: Aug. 15, 2000

[54] COMPUTER ARCHITECTURE FOR VIDEO DATA PROCESSING AND METHOD THEREOF

[75] Inventors: Ian John Buckley, Los Altos; Bryan R. Martin, Campbell, both of Calif.

[73] Assignee: 8×8, Inc., Santa Clara, Calif.

[21] Appl. No.: 08/975,768

[22] Filed: Nov. 21, 1997

Related U.S. Application Data

[63] Continuation-in-part of application No. 08/692,993, Aug. 6, 1996, Pat. No. 5,901,248, which is a continuation of application No. 07/838,380, Feb. 19, 1992, Pat. No. 5,594,813.

[51] Int. Cl.[7] ............................... G06K 9/36; G06K 9/46
[52] U.S. Cl. ........................................... 382/236; 382/238
[58] Field of Search .................................. 382/236, 238; 358/430; 345/505

[56] References Cited

U.S. PATENT DOCUMENTS

| | | |
|---|---|---|
| 5,379,351 | 1/1995 | Fandrianto et al. . |
| 5,594,813 | 1/1997 | Fandrianto et al. . |
| 5,623,556 | 4/1997 | Murayama et al. ..................... 382/236 |
| 5,901,248 | 5/1999 | Fandrianto et al. ..................... 382/236 |

*Primary Examiner*—Amelia Au
*Assistant Examiner*—Martin E Miller
*Attorney, Agent, or Firm*—Crawford PLLC

[57] ABSTRACT

A system and method for video data processing for searching a region of overlapping candidate blocks to locate the best match to a comparably sized reference block comprising plurality of tree adder computational structures which each calculate the sum of absolute difference values for the corresponding data pixels in the comparison. The system further comprises a memory and addressing configuration comprising a dual part RAM, a funnel shifter, and control logic to supply the necessary data pixel values to allow the plurality of tree adders to compute the sum of absolute difference values for adjacent locations concurrently. Another aspect of the system and method for video processing is accumulating two values representing mathematical comparisons of two multi-dimensional images performed in a pixel-wise manner to determine which of the comparison produces less of a difference between the compared images.

17 Claims, 17 Drawing Sheets

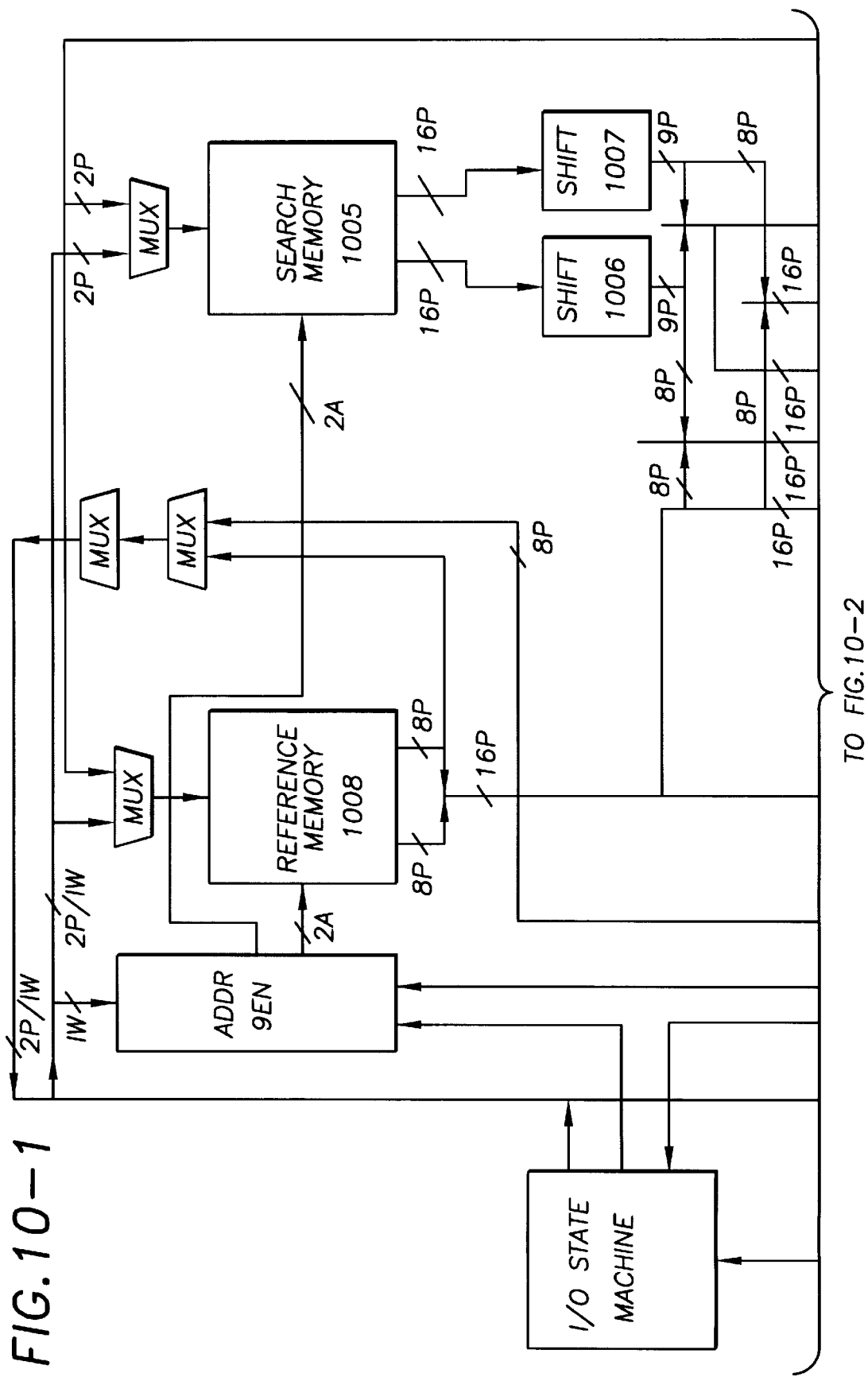

COMPUTER ARCHITECTURE FOR VIDEO DATA PROCESSING AND METHOD THEREOF

RELATED PATENT DOCUMENTS

This is a continuation-in-part of U.S. patent application Ser. No. 08/692,993, filed on Aug. 6, 1996, now U.S. Pat. No. 5,901,248 (8X8S.207PA), which is a continuation of U.S. patent application Ser. No. 07/838,380, filed on Feb. 19, 1992, now U.S. Pat. No. 5,594,813 (8X8S.M1926). This patent application is also related to U.S. Pat. No. 5,379,351 (8X8S.M1532), filed on Jan. 3, 1995. These patent documents are incorporated herein by reference.

FIELD OF THE INVENTION

This present invention relates to communication systems involving video data and other types of data. More particularly, the present invention relates to a specialized computer architecture for use as part of a video data processor.

BACKGROUND

Applications such as video telephone, digital television, and interactive multimedia using such digital storage technology as CD-ROM, digital audio tape, and magnetic disk require digital video coding, or video compression, to achieve the necessary high data transfer rates over relatively low bandwidth channels. Various standards have been proposed for video coding. For example, standards have been adopted by the International Standards Organization ("ISO") involving the storage and transmission of still images and motion-based images. More specifically, continuous-tone still image applications are addressed by the JPEG standard, teleconferencing is addressed by the Px64 standard, and full-motion video is addressed by the MPEG standard. An application such as interactive multimedia running on a personal computer or workstation may well require implementations of some or all of these compression techniques, as well as other techniques for voice mail and annotation and for lossless data compression of arbitrary binary files to be stored to disk or communicated to other computers. Moreover, new compression algorithms and modifications of current compression algorithms will be developed. Different compression algorithms have different resolution, bandwidth, and frame rate requirements, which are best accommodated by a programmable vision processor rather than a multitude of separate, dedicated vision processors for each function.

While building block implementations of vision processors have met with some success, there is a continued need for a programmable, high performance, and low cost digital signal processing architecture suitable for stand-alone use in image and video compression and/or decompression systems. Programmability is desirable because of the wish to accommodate a variety of different existing algorithms, custom versions of existing algorithms, and future algorithms. High performance and low cost are desirable because of the price-performance demands of the highly competitive marketplace in which digital signal processing devices are sold.

SUMMARY OF THE INVENTION

The present invention is generally directed to a video data processing arrangement and method in which a first image is compared with locations within a second image by accumulating first and a second pixel-wise values representing mathematical comparison of the first and second image at two locations to determine which of the two accumulated values is less.

According to another aspect of the present invention, two horizontally adjacent Sum of Absolute Difference (SAD) values are simultaneously calculated within two different tree adder structures to calculate the SAD value for each line of the comparison within the N×N image where the first tree adder compares pixels [0:N−1] of the candidate image with the N pixels of the reference image and the second tree adder compares pixels [1:N] of the candidate image with the N pixels of the referenced image, and where pixels [0:N] of the candidate image are simultaneously read from memory.

According to another aspect of the invention, two vertically adjacent SAD values are simultaneously calculated within two different tree adder structures where the first tree adder compares a line of the candidate image read from memory with a line of the reference image that is also stored into a delay register, and where the second tree adder compares the same line of the candidate image with the prior line of reference image stored in the delay register. The SAD values for the lines of the comparisons are accumulated in a first and second register. The best match location is found by finding the location of the minimum accumulated SAD value.

The above summary of the present invention is not intended to describe each illustrated embodiment of the present invention. The figures and detailed description which follow more particularly exemplify these embodiments.

BRIEF DESCRIPTION OF THE DRAWINGS

The invention may be more completely understood in consideration of the detailed description of various embodiments of the invention which follows in connection with the accompanying drawings, in which.

Figure 1:
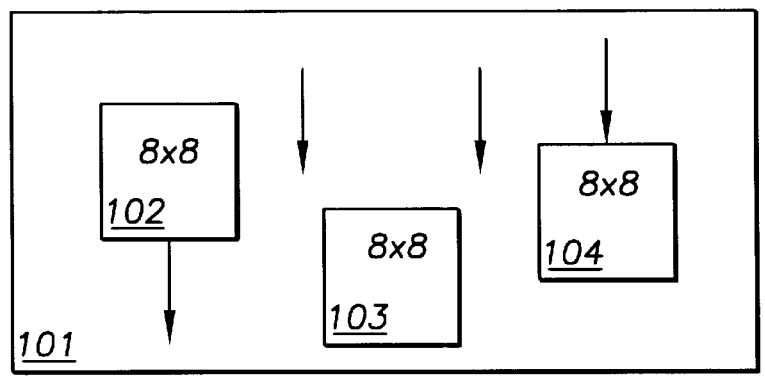
FIG. 1 is a diagram of the particular image matching function being performed by the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the field of image compression, it is often required to search a region of overlapping candidate blocks for a best match to a comparably sized reference block, where a block is defined to consist of an N by M group of pixels. This match between the reference and sample data can be calculated using a process that compares the sum of absolute differences of the corresponding pixels when they are overlaid upon each other to find a minimum value for this sum of absolute difference (SAD). The best match occurs where the value of the sum of absolute differences is a minimal.

Conceptually this problem can be demonstrated using the example shown in FIG. 1. Assuming that one wants to find the best match for an 8×8 size image within a larger reference image, the 8×8 image is located at each location within the larger image to which the bit image is to be compared and the sum of absolute difference value is calculated for each such location on a byte-wise basis. The location where this sum is at a minimum is determined to be the location of the best match.

In FIG. 1, consider the item 101 to be a larger search window and the 8×8 reference image is moved to various locations throughout this item 101. This is demonstrated using the 8×8 image 102 to calculate a value of one particular location the 8×8 image 103 and a different location and so forth. This image is placed at every possible pixel location in item 101 and the SAD is calculated.

In order to fully appreciate the present invention, the description below which refers to the various figures contained herein to describe various aspects of the present invention. These aspects include the image pixel memory and shifter combination and corresponding address method, said tree adder architecture used to calculate the sum of absolute differences, and the architectures which combines multiple tree adders with the memory and shifter combination to calculate simultaneously multiple sum of absolute difference values both in horizontal and vertical directions.

Figure 2A:
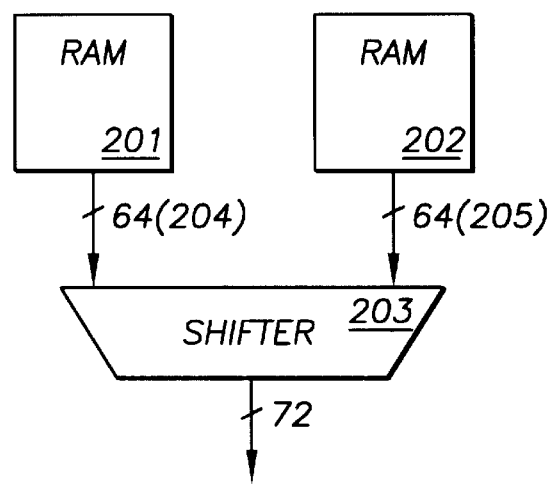
FIGS. 2A and 2B are block diagrams illustrating the RAM and shifter apparatus which is part of the present invention.
Figure 2B:
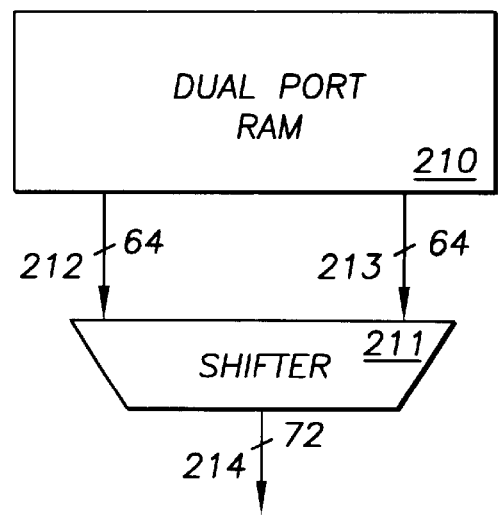

One aspect of the present invention is shown in connection with FIGS. 2A and 2B and relates the image pixel memory and a funnel shifter combination. This involves providing image pixel data from a memory to the computational elements which perform the sum of absolute differences utilizing a RAM and shifter combination. In a particular embodiment, each image pixel value consists of one eight bit byte of data. These image pixel values are stored within a RAM in 64 bit, or 8 byte, wide words.

Figure 3A:
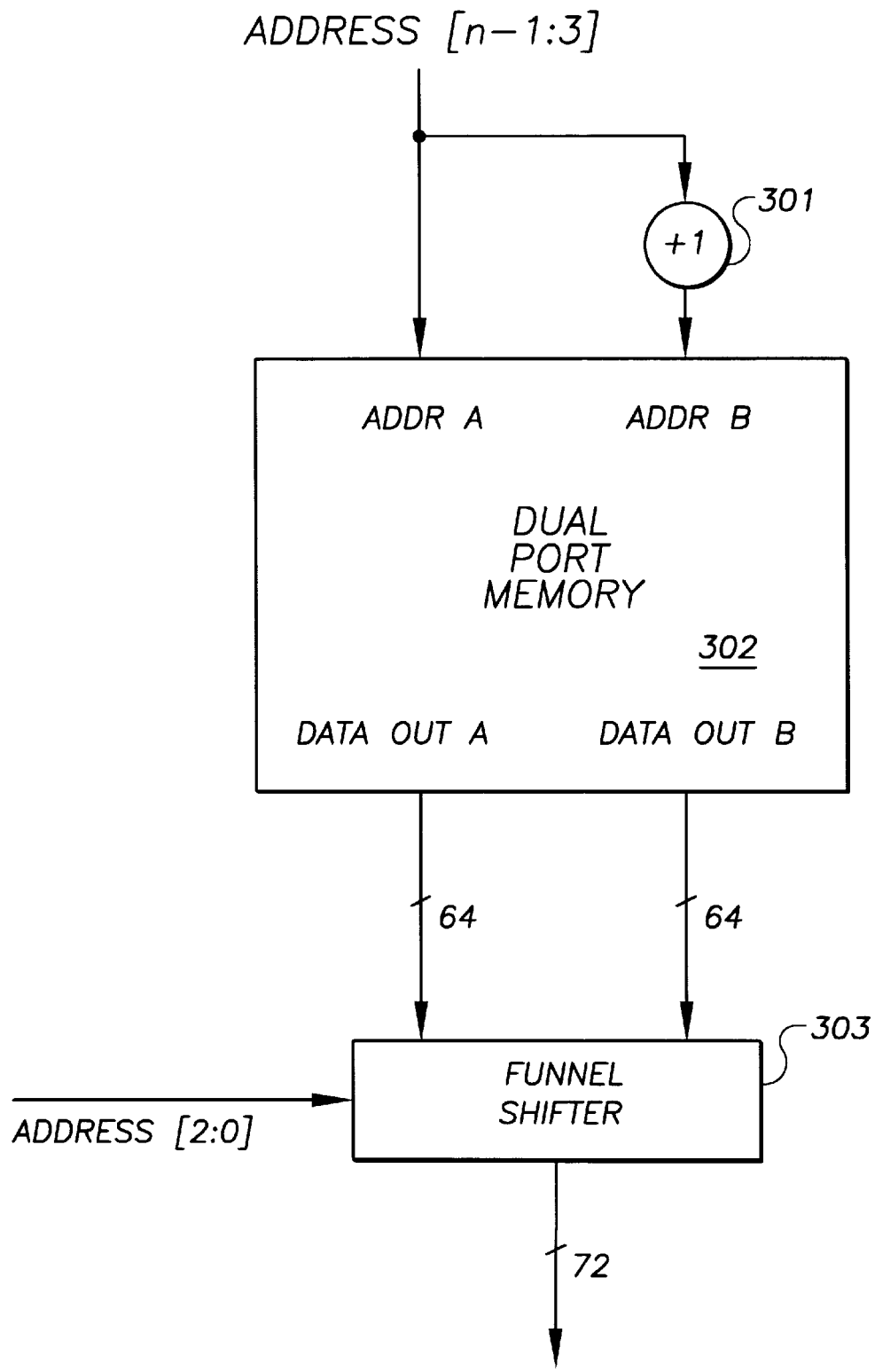
FIGS. 3A and 3B are block diagrams illustrating the addressing of the pixel data stored within the RAM utilizing the shifter according to the particular application of the present invention.
Figure 3B:
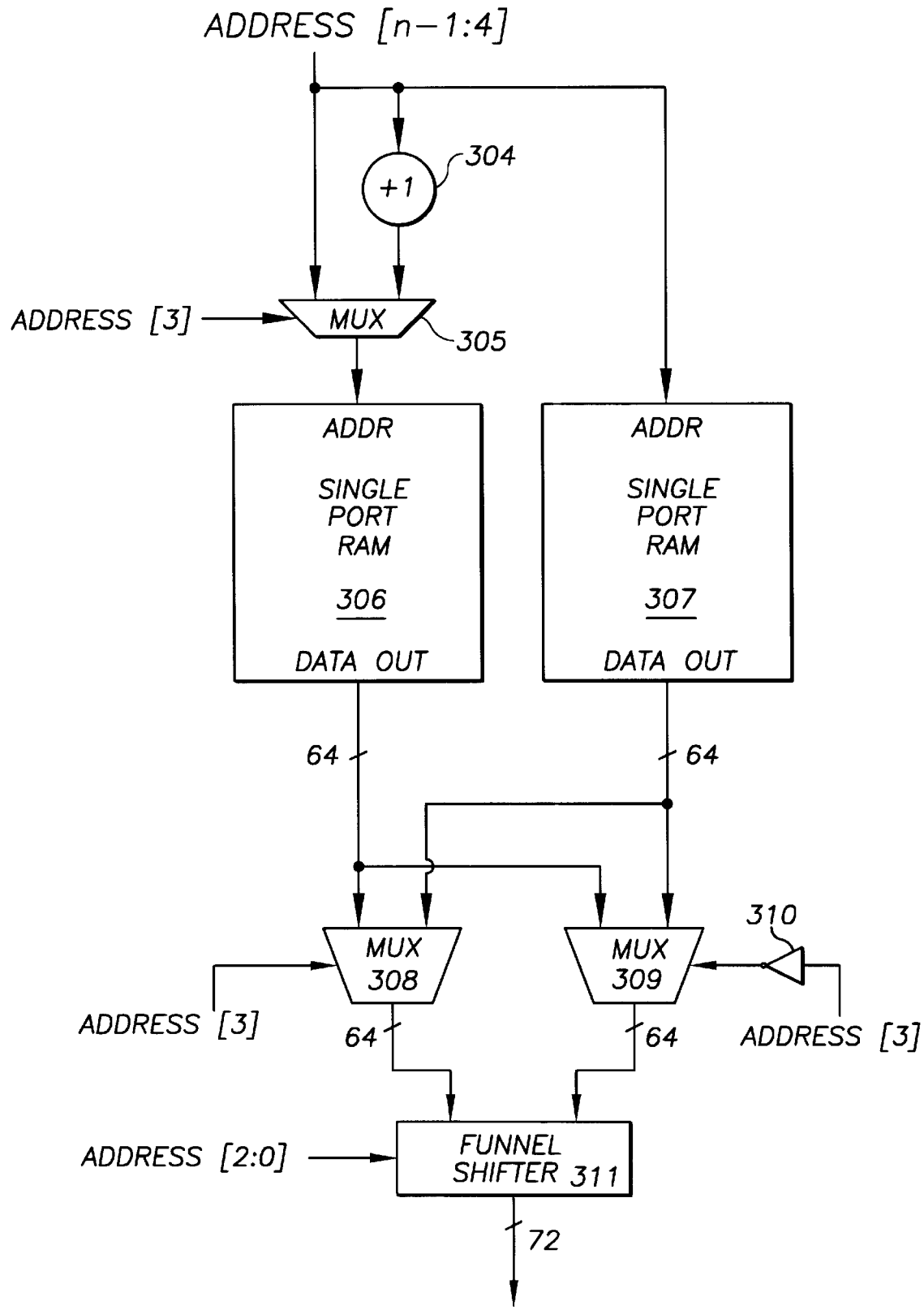
Figure 8A:
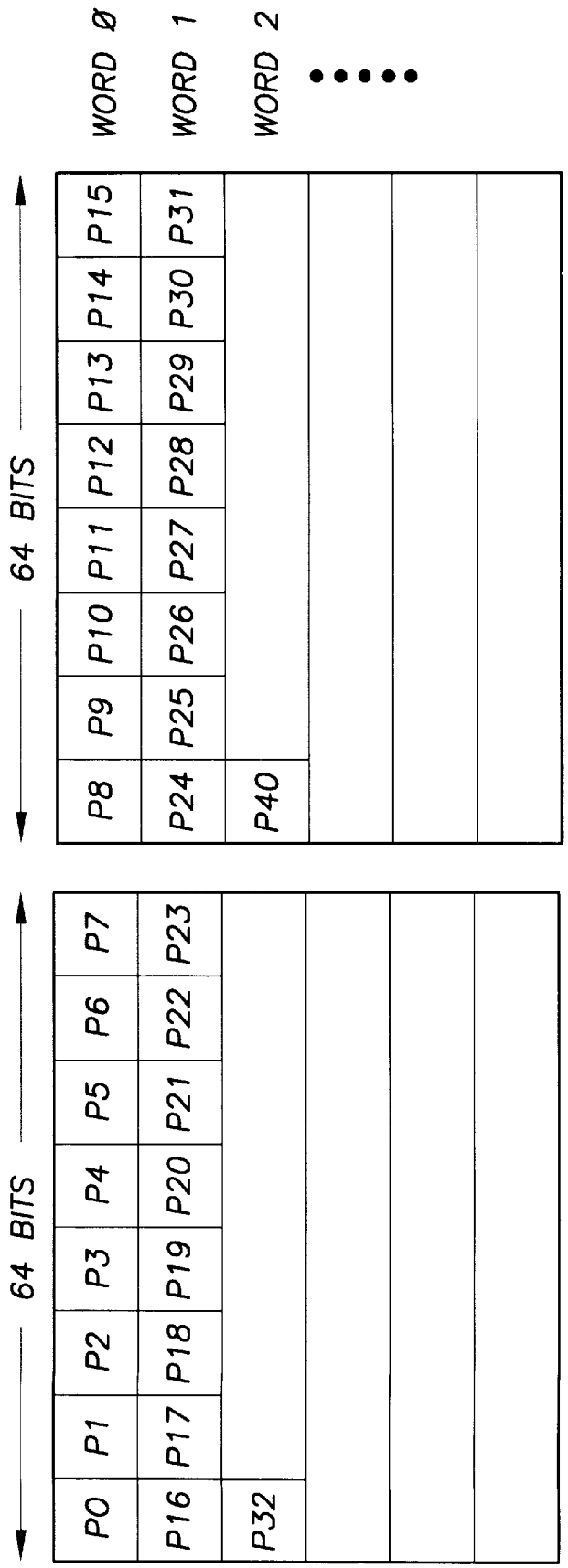
FIGS. 8A and 8B are memory MAP diagrams which demonstrate the distribution of pixel path within the dual port RAMS according to the present invention.
Figure 8B:
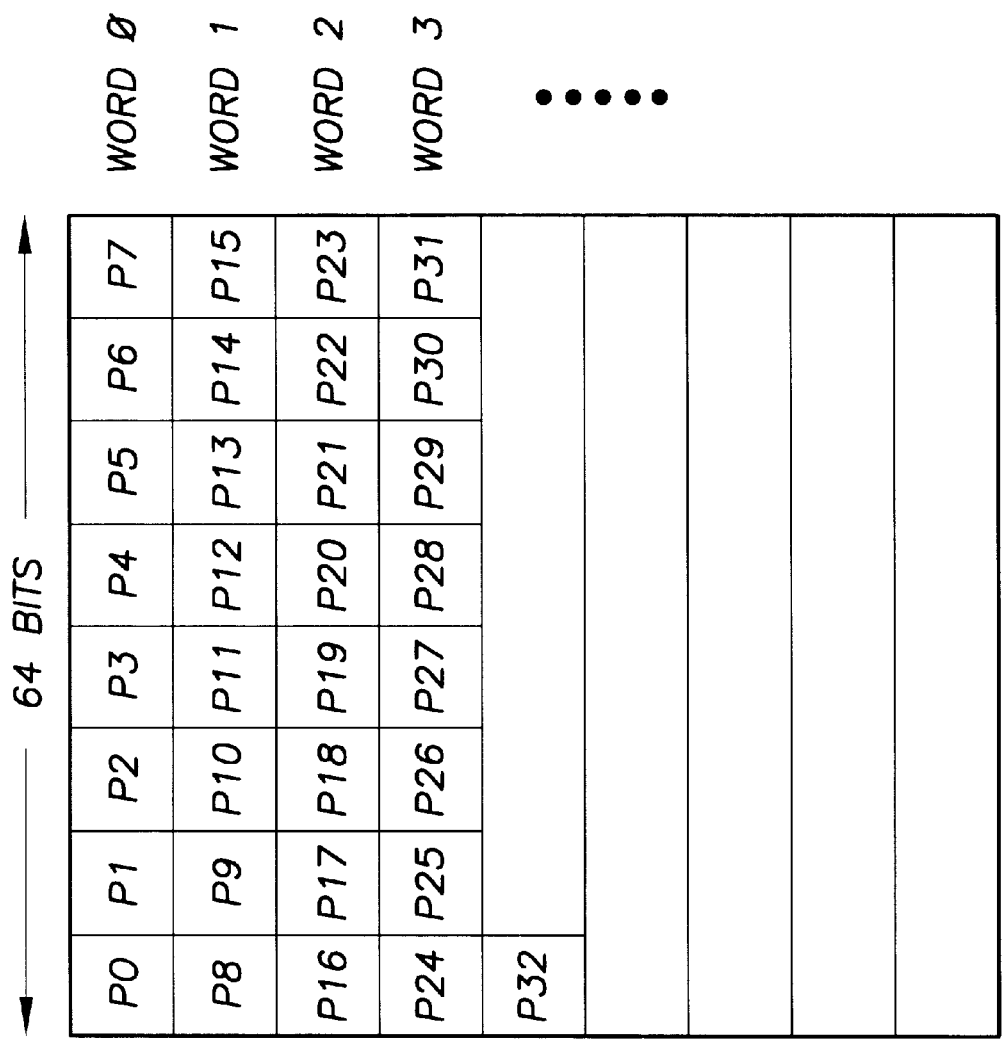
Figures 1, 9:
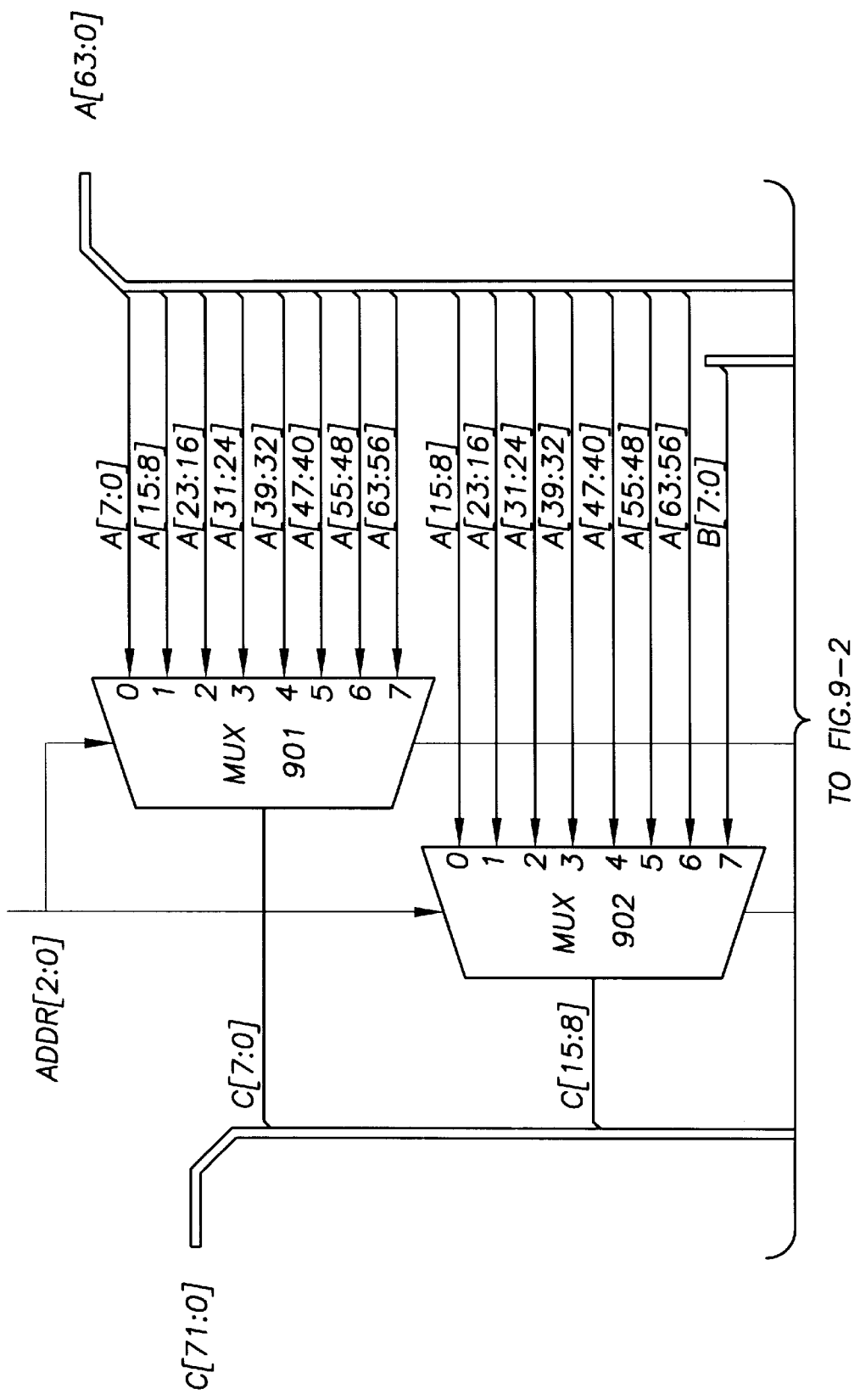
FIG. 9 is a block diagram of the funnel shifter which is used throughout the present invention.

In FIG. 2A, RAM 201 and RAM 202 are shown providing inputs to a funnel shifter element 203. The image being searched is found to be interleaved between both RAM 201 and 202 in order that 2 consecutive words of data can be obtained at the same time. FIG. 8A illustrates the distribution of pixel data. FIG. 2B performs the same function except that dual ported RAM 210 contains only one RAM element while providing multiple means of accessing word data found therein. FIG. 8B illustrates the distribution of pixel data in a dual port RAM. In both FIGS. 2A and 2B, the shifter 203 and 211 are utilized to allow the addressability of any particular byte, or image pixel data, regardless of the particular location of the 8 bit type within the larger 64 bit or 8 byte word. When an image pixel value is to be accessed, the appropriate two successive 64 bit words are read from the memory into the shifter. The shifter then proceeds to shift the 128 bit concatenation of words the appropriate number of bytes so that the particular byte in interest starts on the first byte boundary of a 72 bit word retrieved. FIG. 3A demonstrates how this operation works in more detail. The addressing of the image pixel data is performed in the conventional way except that address bits [2:0] are sent to the funnel shifter to instruct the shifter how many bytes the received word is to be shifted when received. Address bits N−1 through 3, where N is the total number of bits in the address field needed to address the entire memory, are sent to the address the First Memory port. Additionally, the address, as defined by bits [N−1:3], is incremented by one where the incremented address is sent to the second address port of the dual ported memory, or in the case of the embodiment shown in FIG. 2B, the incremented address is sent to the first RAM only in cases where address bit [3] is a 1 (odd) and hence consecutive pixel data is retrieved from word (M) in the second RAM and word (M+1) in the first RAM. This embodiment also contains multiplexer function (309 and 310) to reverse the concatenation of RAM output words when address BIT (3) is set. This arrangement causes the data received at the input of the funnel shifter actually consists of two 64 bit words or a total of 16 bytes of pixel data consisting of 16 consecutive image pixel values. The shifter then allows this 16 byte word to be shifted anywhere between 0 and 7 locations thus allowing the output of the formal shifter to start when any byte boundary contained within this 16 byte word continue onward for a total of 72 bits or 9 bytes. In FIG. 9, the 9 bytes outputted from output by this funnel shifter, shown in this embodiment to be implemented using a series of multiplexers 901–909 are utilized elsewhere within the present invention as discussed below.

Figure 4:
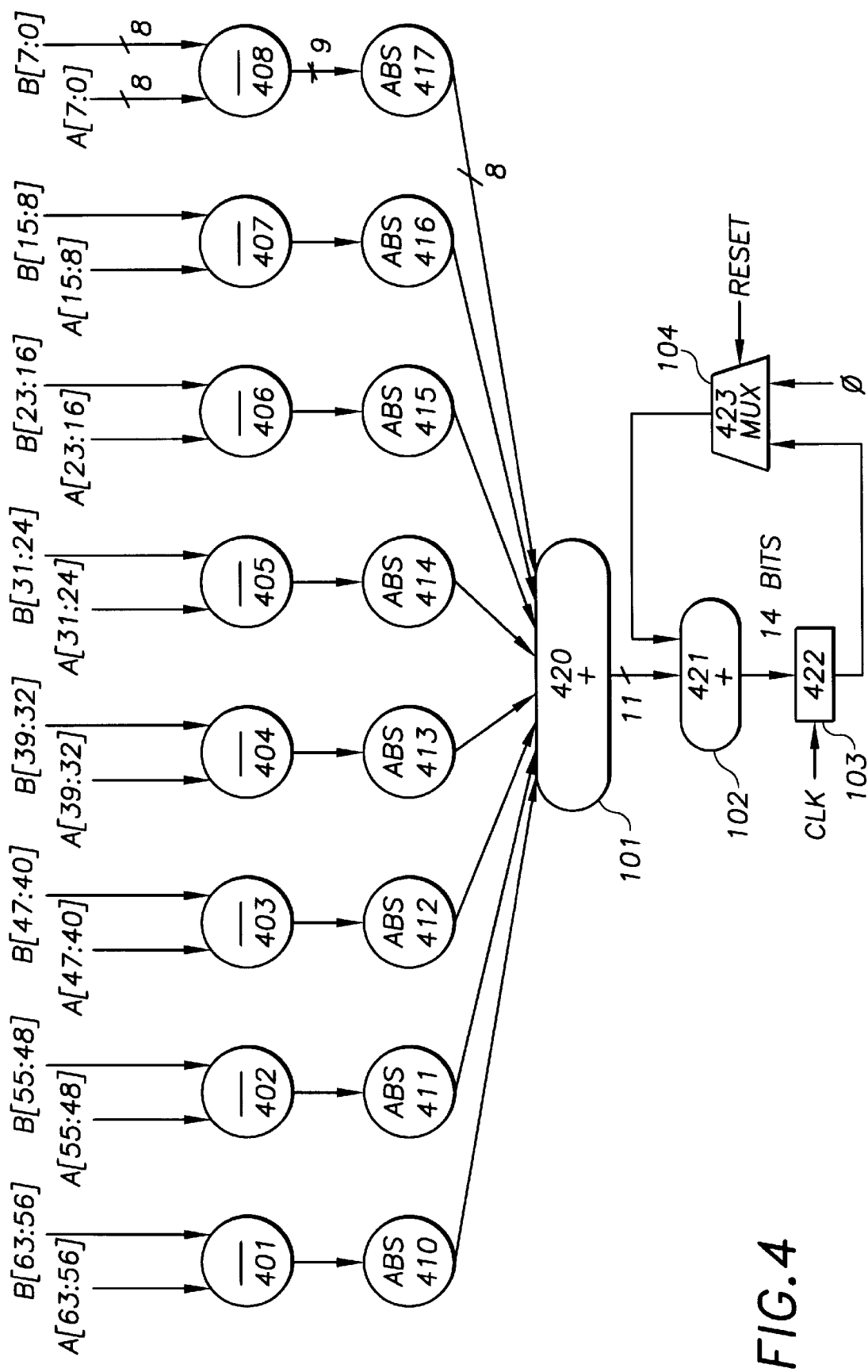
FIG. 4 is a block diagram of a tree adder apparatus which performs the sum of absolute difference calculations according to the present invention.

In FIG. 4, a tree adder is shown which defines the computational structure used to calculate the sum of absolute differences (SAD) for two eight byte words. Since each byte is used to represent an image pixel value, this computational structure will calculate the sum of absolute differences between two rows of image pixel values as if one row was superimposed upon the other while looking for the best match for its location. Item 401 performs a subtraction of input A from input B where each one of these inputs is simply a byte value. For each image pixel value, this same computation is performed in each of the subsequent blocks 402–408. The output of the subtractions blocks are then fed into blocks 410–417 respectively where these blocks perform an absolute number calculation for the difference received. The outputs from blocks 410–417 are then all summed together in item 420 to create the sum of absolute differences of the row of image pixel values. This sum value is then sent through adder 421 into a holding register 422. Output of the holding register is sent through the multiplexer 423 back as the second input into item 421 to allow the accumulation of the sum of absolute differences over multiple rows of image data. As such, an 8×8 area of two images can be compared in eight clock cycles where the sum of absolute differences of each of the eight rows from this image comparison is performed during each of the clock cycles and where the total difference is accumulated in holding register 422. The second input to the multiplexer 423 simply is a zero value thus allowing the adder 421 to add the sum of absolute differences to zero thus resetting the accumulator 422.

This tree adder structure is utilized throughout the present invention to calculate the sum of absolute differences for an 8 byte line of image pixel values. While the present invention is being described in an embodiment containing 8×8 images, the embodiment can be readily modified or extended to perform this operation over any N by M sized image area.

In order to determine the best match between an 8×8 area of an image with a corresponding area and in a reference image, the sum of absolute difference value can be calculated for each pixel location within a search area where the best image is being overlaid upon this reference image. At each location, the sum of absolute difference needs to be determined using the tree adder structure as described in a previous section. This process is repeated for each location, with each calculation requiring eight clock cycles. As such to perform a match of an 8×8 reference with a modest size search window of candidate block, the computational requirements quickly become large. Therefore, significant processing improvements are needed if these matches are to occur during each frame of the video image sequence as the video is generated from a video source. The present invention reduces the processing time for matching an 8×8 image with a search area by concurrently calculating the sum of difference values for adjacent locations within the search area during the same clock cycles.

Figure 5A:
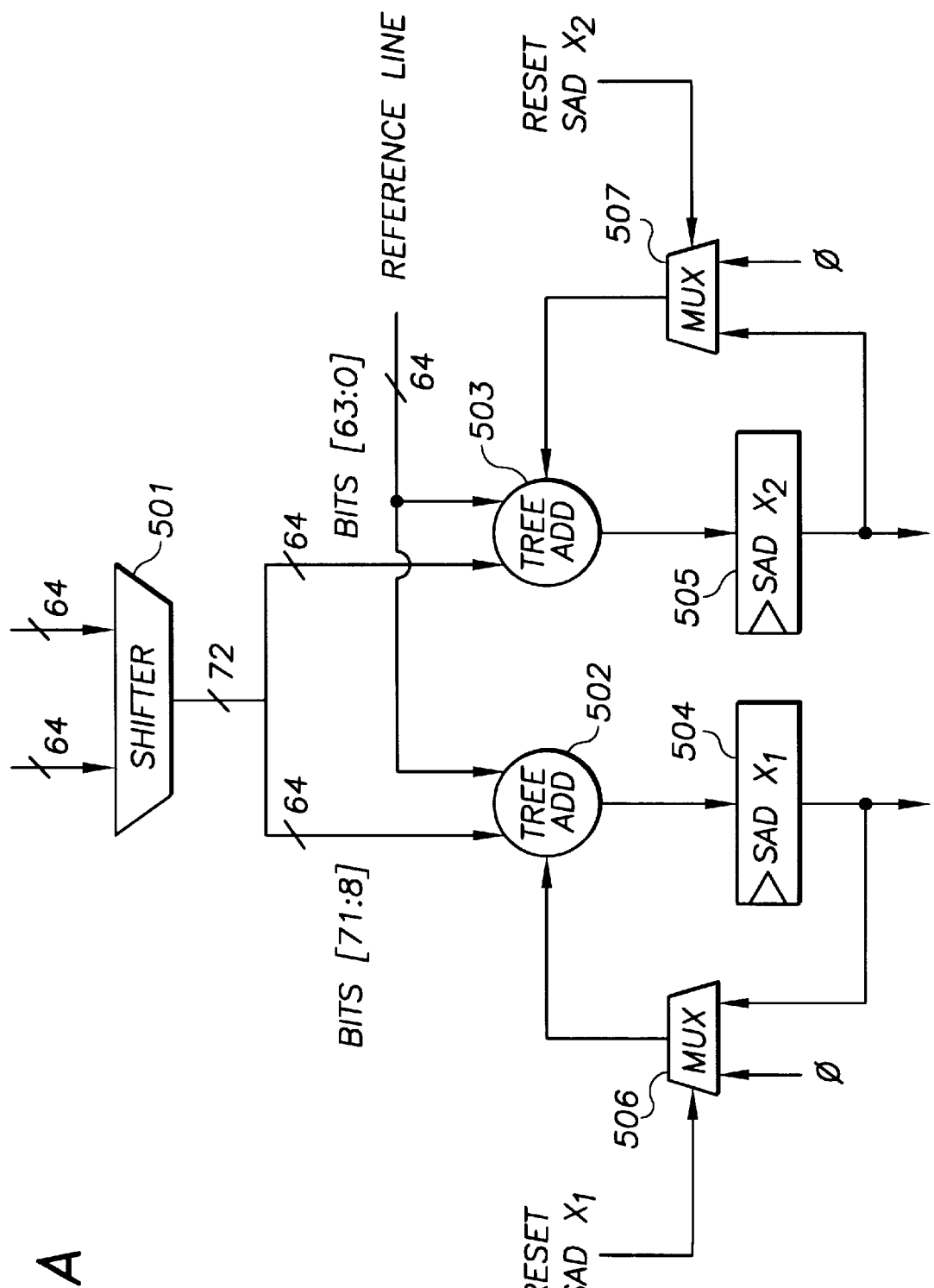
FIG. 5A is a block diagram illustrating a horizontally only implementation of the present invention.
Figure 5B:
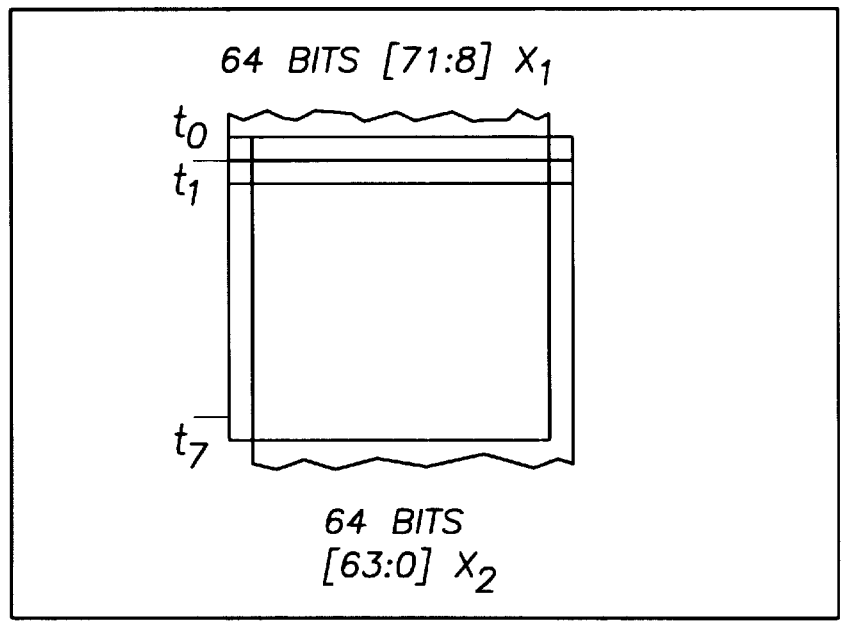
FIG. 5B is a diagram showing the pixel address locations being used in the horizontal only implementation of the present invention.

Referring to FIG. 5B, the calculation of the sum of absolute differences values for two horizontally adjacent locations of an 8×8 reference image within a search window uses seven of the eight image pixel values from the searched image in both calculations. The 8×8 area identified as X1 in FIG. 5B differs from the bytes used in the area identified by X2 by only the first and last bytes of that nine byte sequence for each row of comparison. If the calculation of the sum of absolute difference for these two adjacent locations is performed at the same time, and the pixel values of the overlapping area can be utilized by both calculations simultaneously then only a single access to the memory is required.

Figures 2, 9:
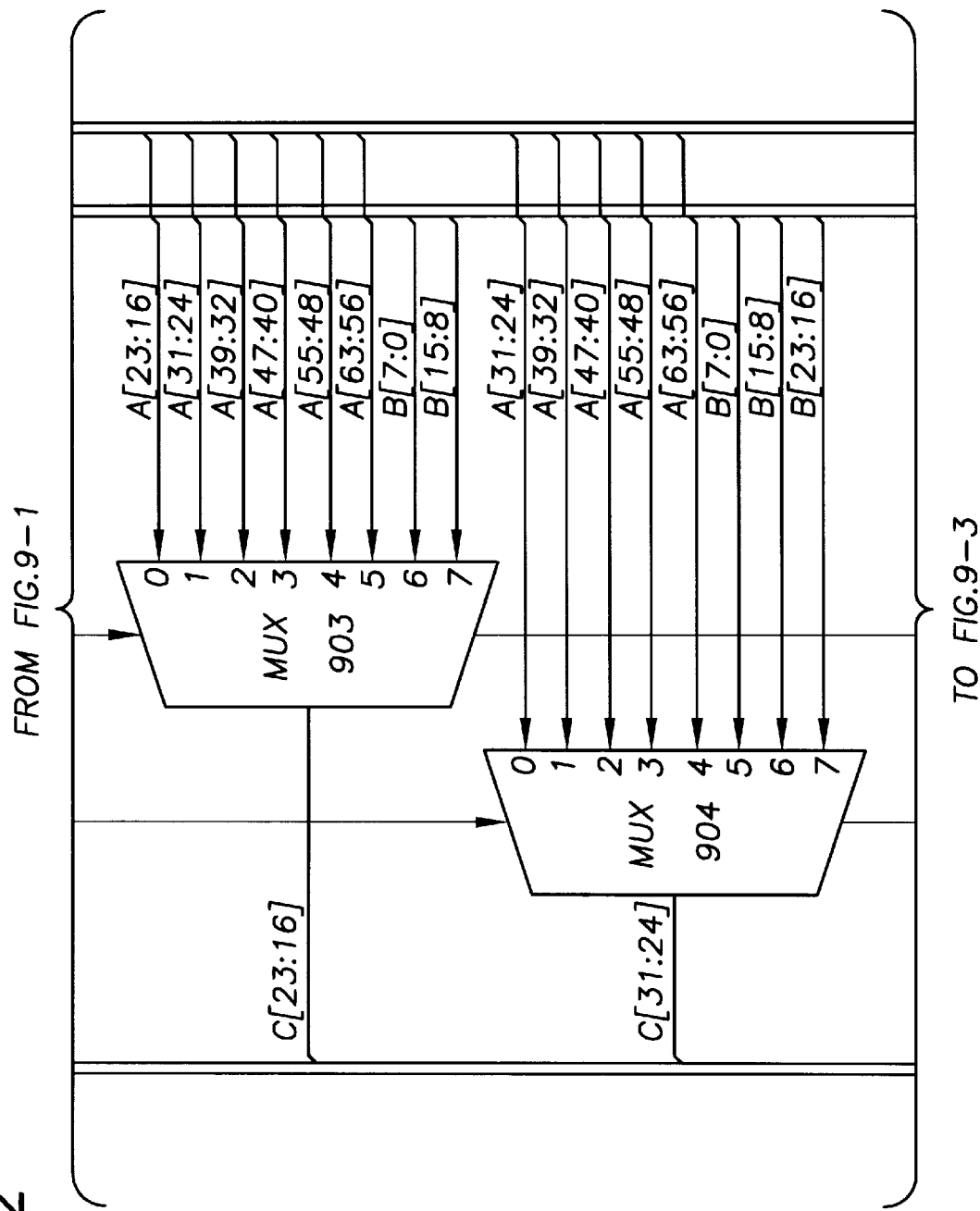
Figures 3, 9:
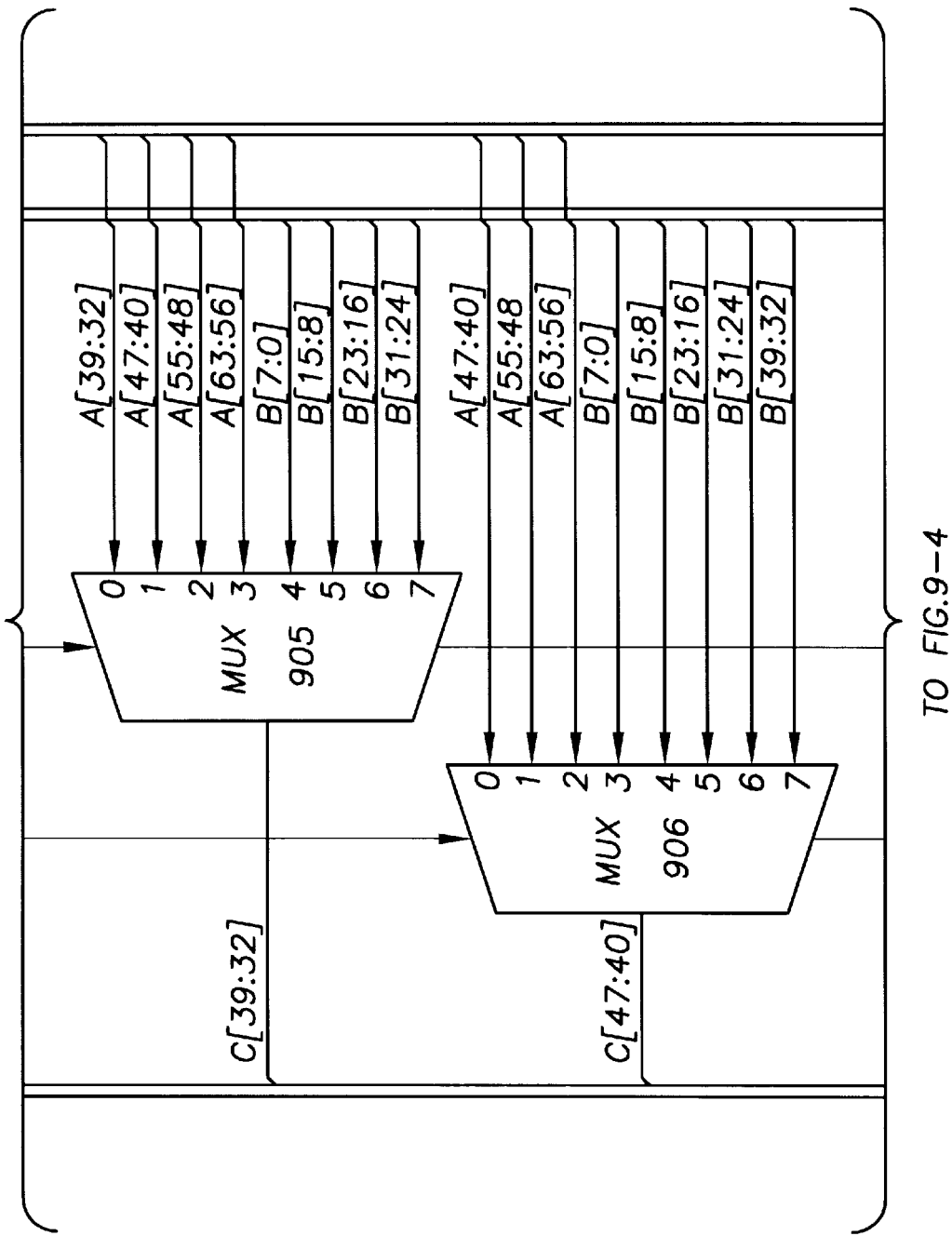
Figures 4, 9:
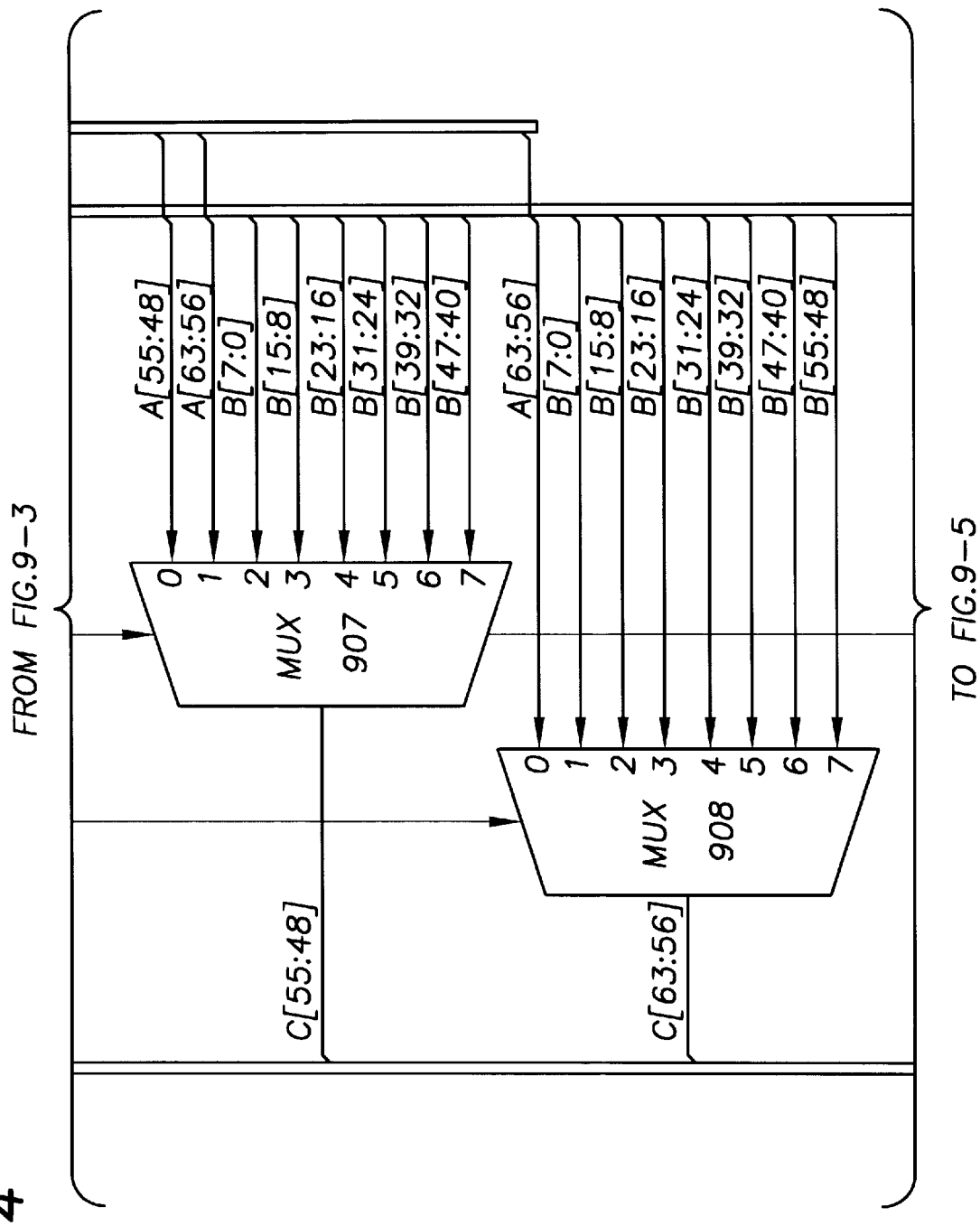
Figures 5, 9:
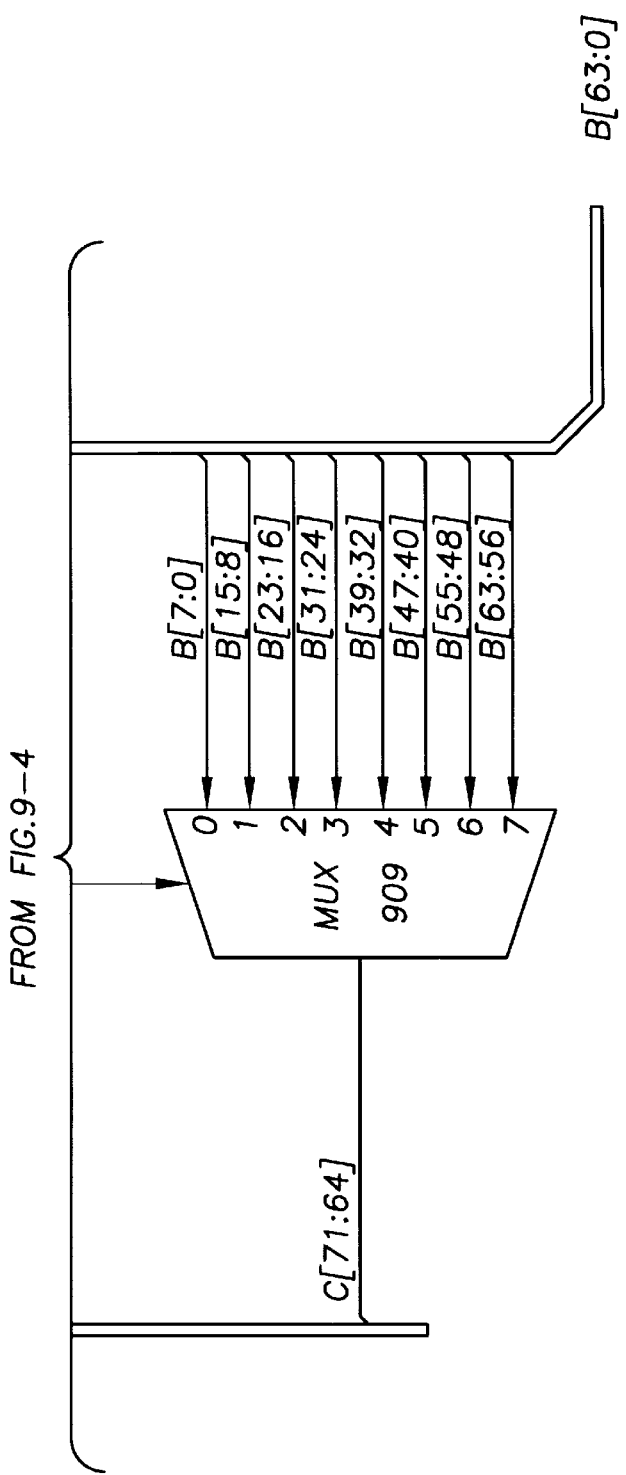

FIG. 5A demonstrates how this process can be performed. A nine byte or 72 bit word is obtained from the shifter described in FIGS. 2 and 3, corresponding to nine adjacent bytes of pixel image data. An 8 byte, 64 bit sequence utilizing bits [71:8] are input into the tree adder 502 with the 8 byte word from bits [63:0] input into a second tree adder 503. The same reference line with which these two locations are to be compared is input into the other input of these two tree adders. In this way, during each clock cycle, a row of image pixel values are compared as shown in FIG. 5B with a first tree adder calculating the sum of absolute differences for area X1 and the second tree adder calculating the sum of absolute differences for area X2. The accumulation register and multiplexers 504, 505, 506, and 507 perform the same accumulation function in the manner described in the previous section regarding the tree adder. Since the input of the reference images is common to both tree adders, the values accumulated after 8 clock cycles using this structure will produce the sum of absolute difference for two adjacent areas within the same image. These two areas are shown in FIGS. 5B as areas X1 and X2.

After eight clock cycles, the accumulation registers 504 and 505 contain the sum of absolute differences for the two areas and these items can be stored for later use. The process can repeat for two additional locations within the image being searched, but now the processing time is reduced in half.

Figure 6B:
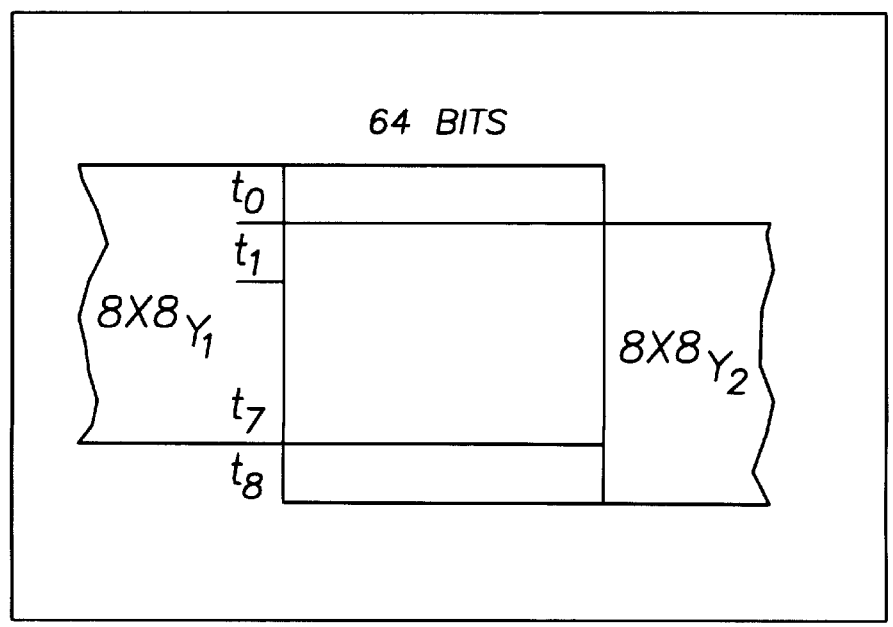
FIG. 6B is a diagram demonstrating the pixel addresses being utilized by the vertical only implementation of the present invention.
Figure 6A:
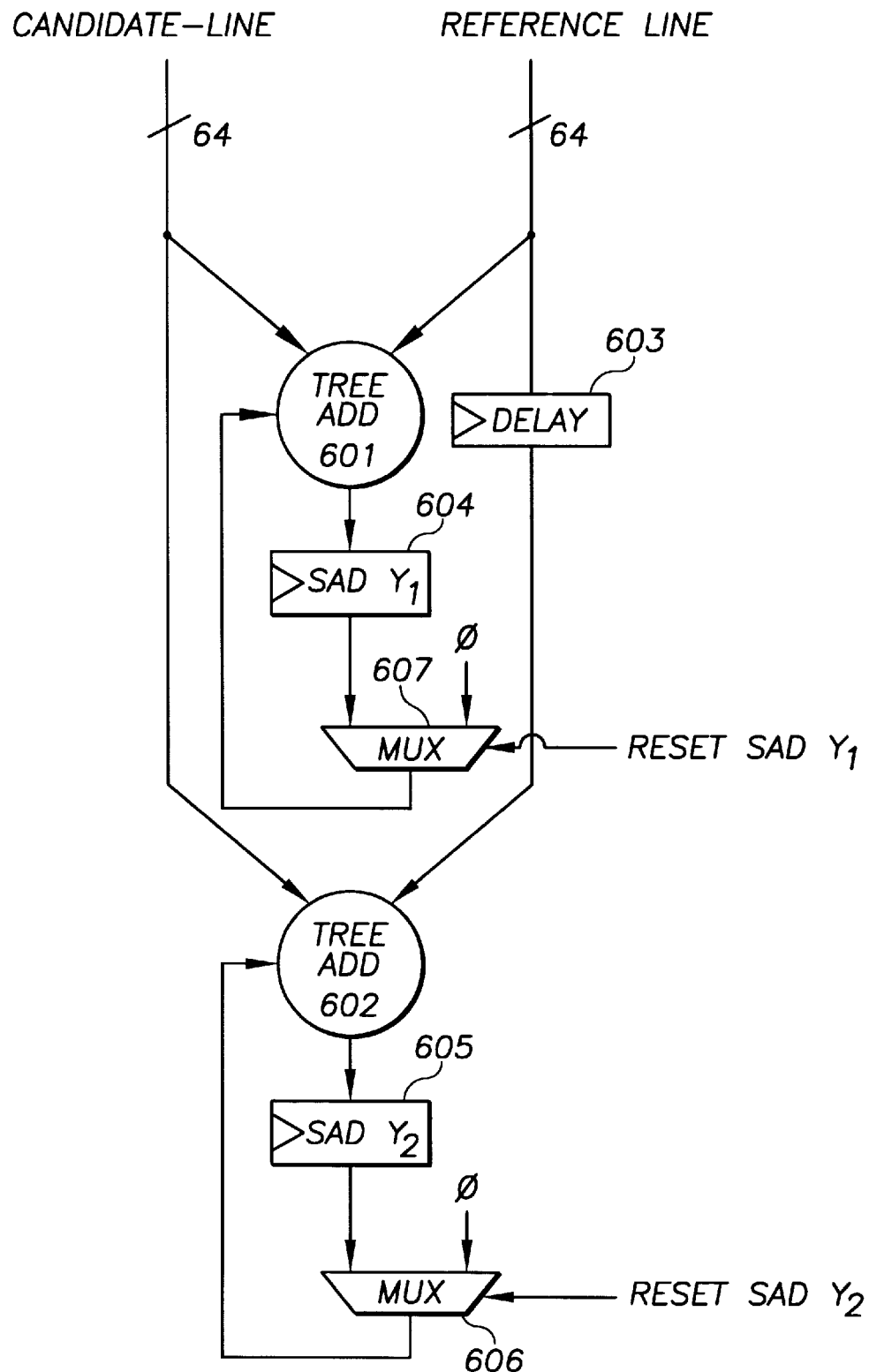
FIG. 6A is a block diagram of a vertical only implementation of the present invention.

Referring to FIG. 6A, a similar improvement in computational efficiency can be gained in the vertical search direction using the similar structures shown in FIG. 6A. Here two tree adders receive the same eight byte search line from the left input to the tree adders 601 and 602. The other input to the tree adders is the reference line, and contains a delay register 603 used to simply hold the previous reference line value as an input to tree adder 602. Again, the accumulation register reset mechanism using register 604, 605 and multiplexer 606 and 607 perform the same function as described in all the previous sections.

During the first clock cycle, tree adder 601 may calculate the sum of absolute difference for an eight pixel search line against an eight pixel reference line. During this clock cycle, the eight pixel reference line is loaded into delay register 603. During the second clock cycle the accumulation of the SAD with the comparison of the second line of the search line with the second line of the reference line occurs. However, in tree adder 602 the second line from the search window is compared with the first line of the reference line and the accumulation process starts there. The result of this is shown in FIG. 6B where during the first eight clock cycles shown as $T_0-T_7$, the sum of absolute difference value is calculated for the first eight rows of an image. During clock cycles $T_1-T_8$, the ninth clock cycle of the sequence a second tree adder 602 calculates the sum of absolute difference for the comparison of rows 1–8. The result of this calculation is determined within nine clock cycles, two vertically adjacent areas within a search area can be calculated without the need to reaccess the overlapping rows of the search areas from the memory where they are stored. Again, this provides a 2× speed up of the calculation of the sum of absolute differences for an 8×8 area within a larger search area.

Figure 7:
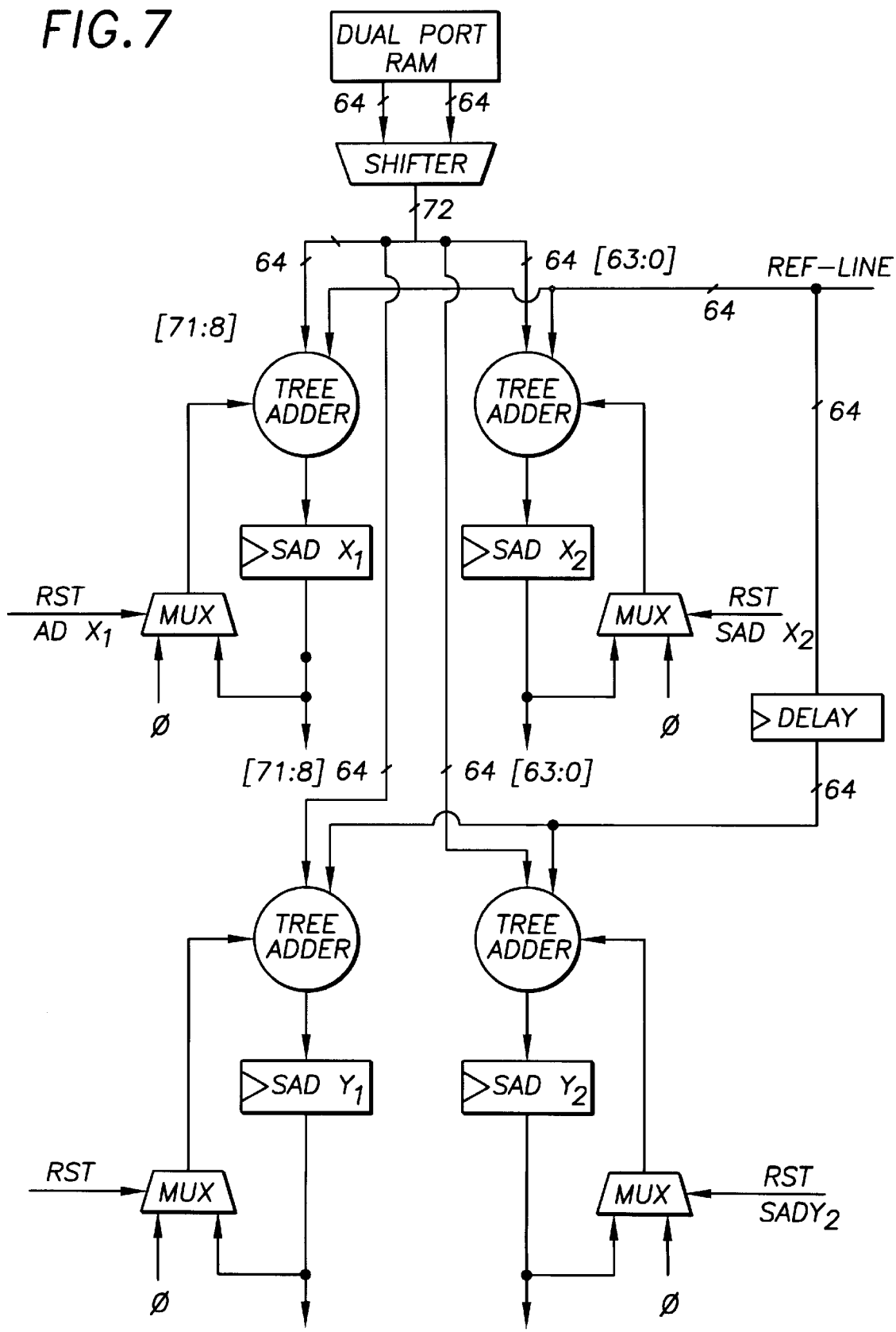
FIG. 7 is a block diagram according to the present invention implementing the combination of both the horizontal and vertical implementations of the present invention within a single apparatus.

FIG. 7 shows how the horizontal concurrent sum of absolute difference structure can be easily combined with the vertical concurrent sum of absolute difference structure to perform a 4× improvement in the processing of the sum of absolute difference values for a search image. The structure shown within FIG. 7 will therefore generate four accumulated sum of absolute difference values for four adjacent locations within the overlap of the reference 8×8 image with a input image being searched every eight clock cycles in sustained use, or nine cycles in isolated use.

Figures 2, 10:
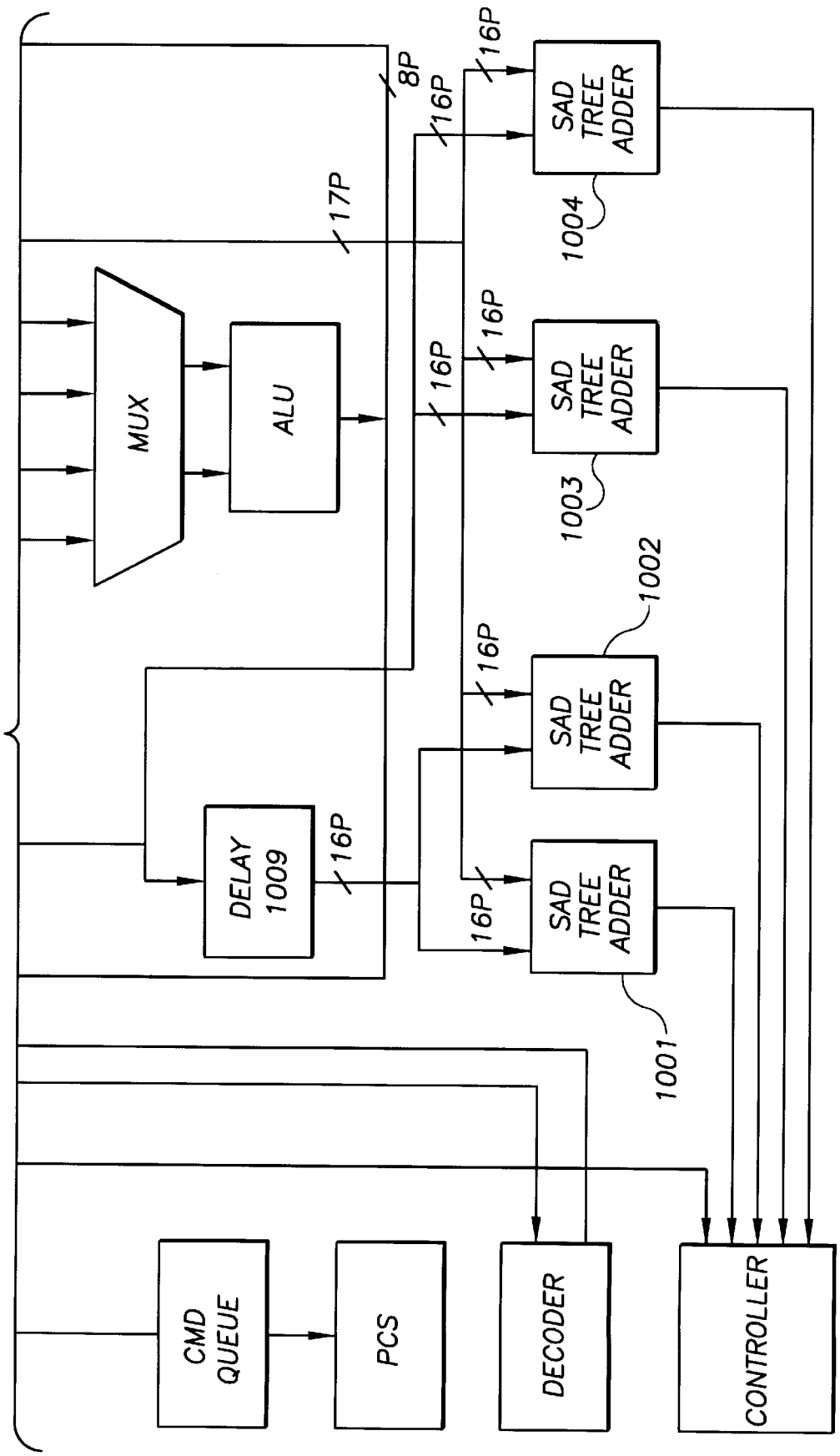
FIG. 10 is a block diagram of a larger video processing system containing the present invention.

FIG. 10 shows a block diagram of the present invention within the context of a larger video processing system. The particular embodiment shown in FIG. 10 corresponds to a four tree adder implementation 1001, 1002, 1003, 1004, similar to the embodiment described above as shown in FIG. 7. The processing would utilize search memory 1005 and funnel shifters 1006, 1007 to provide the first input to the tree adders and reference memory 1008 and delay register 1009 to provide the second input to the tree adders. The present invention, as shown in this embodiment, would operate in the manner consistent with the description described above regarding the computation to be performed in comparing the images.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of comparing first and second two-dimensional images to identify a desired match location for the first image within a search area of the second image, wherein each image represented by pixel values and one of the dimensions has at least N pixel values, comprising the steps of:

reading 2N pixel values corresponding to a line of the first image from a memory into a funnel shifter;

shifting the pixel values within the funnel shifter to align the pixel values on a desired pixel boundary;

receiving N+1 pixel values corresponding to a line within the search area of the second image;

accumulating a first pixel-wise sum of absolute difference (SAD) values within a first tree adder using a first set of pixels output from the funnel shifter and a selected set of pixels from the lines of the second image;

accumulating a second pixel-wise sum of absolute difference (SAD) values within a second tree adder using a second set of pixels output from the funnel shifter and the selected set of pixels from the lines of the second image; and finding a minimum accumulated SAD value which corresponds to the desired match location for the first image within the second image.

2. The method according to claim 1, wherein the first set of pixel values from the funnel shifter correspond to bits [N−1:0] and the second set of pixel values correspond to bits [N:1] from the funnel shifter.

3. A method of comparing first and second two-dimensional images to identify a desired match location for the first image with a search area of the second image, wherein each image is represented by pixel values and one of the dimensions has at least N pixel values, comprising the steps of:

reading N pixel values corresponding to a line of the first image from a memory into a delay register;

receiving N pixel values corresponding to a line within the search area of the second image;

accumulating a first pixel-wise sum of absolute difference (SAD) values within a first tree adder using the pixels output from the memory and the received pixels from the lines of the second image;

accumulating a second pixel-wise sum of absolute difference (SAD) values within a first tree adder using the pixels output from the delay register and the pixels from the lines of the second image; and finding a minimum accumulated SAD value which corresponds to the desired match location for the first image within the second image.

4. For use in locating a match location for a two-dimensional reference image within a search area of a two-dimensional candidate image, wherein the reference image and the candidate image are characterized as being comprised of a set of pixel values, and one of the dimensions is defined by at least N pixel values, a method of comparing the reference image and the search area of the candidate image, comprising the steps of:

reading 2N pixel values corresponding to a line of the sample image from a memory into a funnel shifter;

shifting the pixel values within the funnel shifter to align the pixel values on a desired pixel boundary;

receiving N+1 pixel values corresponding to a line within the search area of the reference image;

accumulating a first pixel-wise sum of absolute difference (SAD) value within a first tree adder using pixels [N−1:0] from the output of the funnel shifter with pixels [N−1:0] each line of the candidate image;

accumulating a second pixel-wise SAD value within a second tree adder using pixels [N:1] from the output of the funnel shifter with pixels [N−1:0] each line of the candidate image; and determining which of the first accumulated pixel-wise SAD and second accumulated pixel-wise SAD is less.

5. For use in locating a match location for a two-dimensional reference image within a search area of a two-dimensional candidate image, wherein the reference image and the candidate image are characterized as being comprised of a set of pixel values, and one of the dimensions is defined by at least N pixel values, a method of comparing the reference image with the search area of the candidate image, comprising the steps of:

reading N pixel values corresponding to a line of the reference image into a delay register;

receiving N pixel values corresponding to a line of pixel values within the search area of the candidate image;

accumulating a first pixel-wise sum of absolute difference (SAD) within a first tree adder using the line of the reference image read from memory with the lines of the received search area;

accumulating a second pixel-wise SAD within a second tree adder using a prior line of N pixel values stored within the delay register with the lines of the received search area; and determining which of the first and second accumulated pixel-wise SAD is less.

6. A method for locating a match location for an 8×8 reference image within a search area of a candidate image, comprising the steps of:

(1) setting a memory address to the first location within the search area;

(2) setting a memory address to the first line within an 8×8 reference image;

(3) resetting a first and a second accumulator register to zero;

(4) simultaneously reading 16 bytes of pixel data from the reference memory into a funnel shifter;

(5) simultaneously receiving 8 bytes of a reference line of pixel data;

(6) simultaneously computing a byte-wise sum of absolute difference (SAD) within a first tree adder using bytes [7:0] from the shifter with bytes [7:0] from the reference line of pixels;

(7) accumulating the first SAD value within the first accumulator register;

(8) simultaneously computing a byte-wise sum of absolute difference (SAD) within a second tree adder using bytes [8:1] from the shifter with bytes [7:0] from the reference line pixels;

(9) accumulating the second SAD value within the second accumulator register;

(10) repeating steps (3) through (8) for each of the 8 lines of the 8×8 image;

(11) saving the accumulated first and second SAD values;

(12) setting the memory address to the next location within the search area;

(13) repeating steps (3) through (12) for each location within the search area to be directed; and

(14) finding the location with the minimum SAD value.

7. A method for locating a match location for an 8×8 reference image within a search area of a candidate image comprising the steps of:
(1) setting a memory address to the first location within the search area to be checked;
(2) setting a memory address to the first line of an 8×8 reference image;
(3) resetting a first accumulator register to zero; and one cycle later, resetting a second accumulator to zero;
(4) simultaneously reading 8 bytes of data from the reference memory into a delay register;
(5) simultaneously receiving 8 bytes of a candidate line of pixel values;
(6) simultaneously computing a byte-wise sum of absolute differences (SAD) using bytes [7:0] from the candidate line of pixels;
(7) accumulate the first SAD value within the first accumulator register;
(8) simultaneously computing a byte-wise sum of absolute difference value (SAD) within a second tree adder using bytes [7:0] from the output of the delay register within bytes [7:0] of the candidate line;
(9) accumulating the second SAD value within the second accumulator register;
(10) repeating steps (3) through (8) for each of the eight lines of the 8×8 image;
(11) saving the accumulated first and second SAD values;
(12) setting the memory address for the next location within the search area to be checked; and
(12) repeating steps (3) through (12) for each locator within the search area to be checked; and then finding the location with the minimum SAD value.

8. An apparatus for of comparing first and second two-dimensional images, each represented by pixel values and one of the dimensions has at least N pixel values, comprising:
means for reading 2N pixel values corresponding to a line of the first image from a memory into a funnel shifter;
means for shifting the pixel values within the funnel shifter to align the pixel values on a desired pixel boundary;
means for receiving N+1 pixel values corresponding to a line within the search area of the second image;
means for accumulating a first pixel-wise sum of absolute difference (SAD) values within a first tree adder using a first set of pixels output from the funnel shifter and a selected set of pixels from the lines of the second image;
means for accumulating a second pixel-wise sum of absolute difference (SAD) values within a second tree adder using a second set of pixels output from the funnel shifter and the selected set of pixels from the lines of the second image; and
means for determining which of the first and second accumulated pixel-wise SAD is less.

9. The apparatus according to claim 8, wherein the first set of pixel values from the funnel shifter correspond to bits [N−1:0] and the second set of pixel values correspond to bits [N:1] from the funnel shifter.

10. An apparatus for comparing first and second two-dimensional images, each represented by pixel values and one of the dimensions has at least N pixel values, comprising:
means for reading N pixel values corresponding to a line of the first image from a memory into a delay register;
means for receiving N pixel values corresponding to a line within the search area of the second image;
means for accumulating a first pixel-wise sum of absolute difference (SAD) values within a first tree adder using the pixels output from the memory and the received pixels from the lines of the second image;
means for accumulating a second pixel-wise sum of absolute difference (SAD) values within a second tree adder using the pixels output from the delay register and the received pixels from the lines of the second image; and
means for determining which of the first and second accumulated pixel-wise SAD is less.

11. An apparatus for of comparing first and second two-dimensional images, each represented by pixel values and one of the dimensions has at least N pixel values, comprising:
a first memory for providing 2N pixel values corresponding to a line of the first image to a funnel shifter;
the funnel shifter for shifting the pixel values within the funnel shifter to align the pixel values on a desired pixel boundary;
a second memory for providing N+1 pixel values corresponding to a line within the search area of the second image;
a first tree adder for accumulating a first pixel-wise sum of absolute difference (SAD) values using a first set of pixels output from the funnel shifter and a selected set of pixels from the lines of the second image;
a second tree adder for accumulating a second pixel-wise sum of absolute difference (SAD) values using a second set of pixels output from the funnel shifter and the selected set of pixels from the lines of the second image; and
means for determining which of the first and second accumulated pixel-wise SAD is less.

12. The apparatus according to claim 11, wherein the first set of pixel values from the funnel shifter correspond to bits [N−1:0] and the second set of pixel values correspond to bits [N:1] from the funnel shifter.

13. An apparatus for comparing first and second two-dimensional images, each represented by pixel values and one of the dimensions has at least N pixel values, comprising:
a first memory for providing N pixel values corresponding to a line of the first image from a memory into a delay register;
a second memory for producing N pixel values corresponding to a line within the search area of the second image;
a first tree adder for accumulating a first pixel-wise sum of absolute difference (SAD) values using the pixels output from the memory and the received pixels from the lines of the second image;
a second tree adder for accumulating a second pixel-wise sum of absolute difference (SAD) values using the pixels output from the delay register and the received pixels from the lines of the second image; and
means for determining which of the first computer pixel-wise SAD and second computed pixel-wise SAD is less.

14. A method of comparing first and second two-dimensional images, each represented by pixel values and one of the dimensions has at least N pixel values, comprising the steps of:

shifting 2N pixel values corresponding to a line of the first image within a funnel shifter to align the pixel values on a desired pixel boundary;

receiving N+1 pixel values corresponding to a line within the search area of the second image;

accumulating first pixel-wise values representing a mathematical comparison of a first set of pixels output from the funnel shifter and a selected set of pixels from the lines of the second image;

accumulating second pixel-wise values representing a mathematical comparison a second set of pixels output from the funnel shifter and the selected set of pixels from the lines of the second image; and determining which of the first and second accumulated pixel-wise values is less.

15. The method according to claim 14, wherein the first set of pixel values from the funnel shifter correspond to bits [N−1:0] and the second set of pixel values correspond to bits [N:1] from the funnel shifter, and further including a step of: finding a minimum accumulated pixel-wise value which corresponds to a desired match location for the first image within the second image.

16. A method of comparing first and second two-dimensional images, each represented by pixel values and one of the dimensions has at least N pixel values, comprising the steps of:

transferring N pixel values corresponding to a line of the first image into a delay register;

receiving N pixel values corresponding to a line within the search area of the second image;

accumulating a first pixel-wise value representing a mathematical comparison of the transferred pixels from the lines of the first image pixel and the received pixel values from the lines of the second image;

accumulating a second pixel-wise value representing a mathematical comparison of the pixel values contained in the delay register and the received pixel values from the line of the second image; and determining which of the first and second accumulated pixel-wise values is less.

17. The method according to claim 16, wherein the method further includes the step of: finding a minimum accumulated pixel-wise value which corresponds to a desired match location for the first image within the second image.

* * * * *